Nov. 22, 1949     W. J. MEAD     2,488,923
DEVICE FOR ASSUMING AND MAINTAINING
CURVED CONFIGURATIONS
Filed Sept. 24, 1945
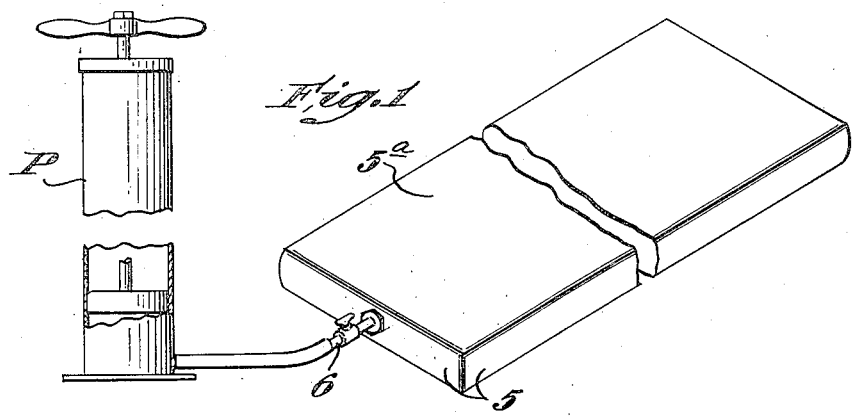
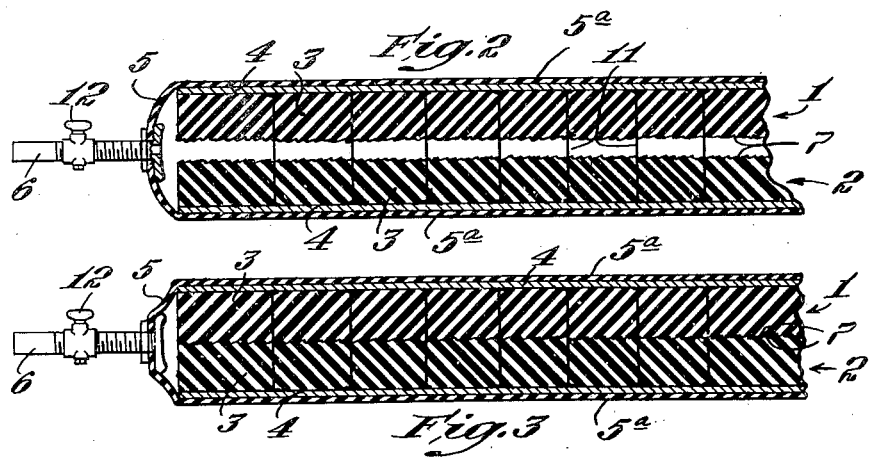
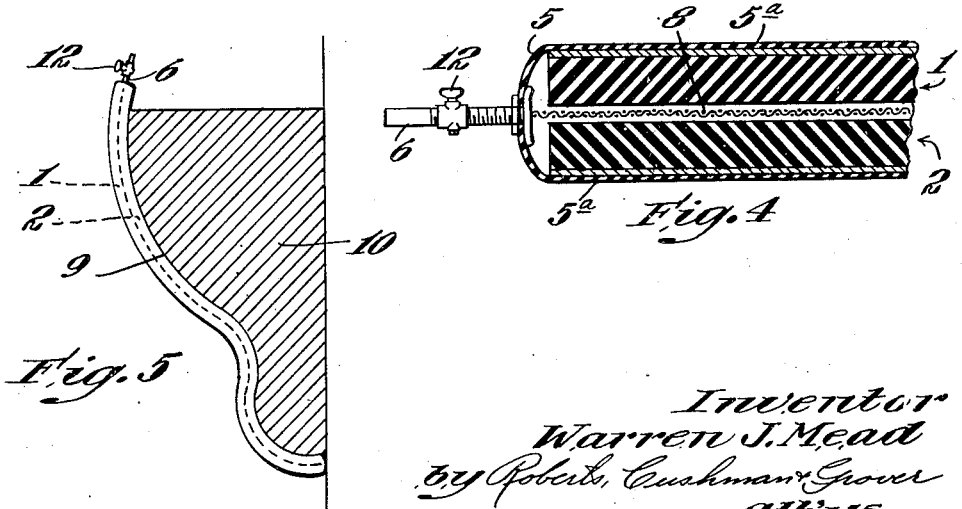
Inventor
Warren J. Mead
By Roberts, Cushman & Grover
att'ys.

Patented Nov. 22, 1949

2,488,923

UNITED STATES PATENT OFFICE 2,488,923

DEVICE FOR ASSUMING AND MAINTAINING CURVED CONFIGURATIONS

Warren J. Mead, Belmont, Mass.

Application September 24, 1945, Serial No. 618,271

6 Claims. (Cl. 33—176)

This invention relates to a device for reproducing curved lines, or profiles of curved surfaces, or for assuming and maintaining curved configurations for other uses. The device is in the form of a laminated sheet or strip adapted to be flexed or bent so as to be fitted and conformed to the curvature of almost any curved line, or curved surface of an object, and then to be set or made substantially rigid in its thus conformed shape, thereby producing and maintaining a duplicate of the curvature. An explanation of the physical properties of certain elements employed may contribute to an understanding of the invention.

(1) If a thin flat sheet or strip of flexible, extensible and compressible material, such as rubber, has cemented or otherwise bonded to one surface only a thin sheet or layer of flexible but substantially non-extensible and non-compressible material, such as sheet metal, metallic fabric, or plastic, or if instead of bonding a separate layer of different material to one surface of the extensible and compressible layer an equivalent effect is produced by so treating one surface only of the extensible and compressible material itself as to form a flexible, non-extensible, non-compressible skin or thin layer integrally bonded to the extensible and compressible layer, the composite sheet will still be flexible since the extensible and compressible layer will lose only part of its flexibility due to the small resistance to bending added by the non-extensible and non-compressible layer.

(2) If, however, a flexible, non-extensible and non-compressible layer is bonded to both sides of the layer of flexible, extensible and compressible material then the composite sheet will thereby be stiffened and be made substantially rigid.

(3) If two composite sheets, each constructed as described in example (1) are assembled with their extensible and compressible surfaces opposed and with their non-extensible, non-compressible surfaces on the outer sides of the assembly, the assembly will be flexible as a unit provided the opposed surfaces are free to slip or shift in a planewise direction, one with relation to the other.

(4) But if the opposed surfaces have non-slipping characteristics, as by being roughened, pebbled, knurled or serrated, or even having a coefficient of friction sufficient to cause them to cling without slipping, or are otherwise locked together against shifting in a planewise direction, as by means of an intervening sheet or layer of flexible material roughened on both sides, and if the two composite strips are pressed together, the opposed surfaces will be interlocked and the assembly will become substantially rigid. This is for the same reason that the structure described in example (2) above is rigid, namely, that there is a non-extensible, non-compressible layer on both outer surfaces of the assembled structure and the material between these layers is in effect integrated.

My invention which involves these principles is illustrated in the accompanying drawings, in which Fig. 1 is a perspective view of a device for duplicating the curvature of a line or surface, part being broken away to indicate indeterminate length;

Fig. 2 is an enlarged, fragmentary cross-section of the device taken longitudinally through the center of the left-hand end of Fig. 1 showing the two composite sheets out of contact;

Fig. 3 is a cross-sectional view of the same device showing the two composite sheets pressed together in locked relation;

Fig. 4 is a similar cross-sectional view illustrating modified means for locking the two composite sheets together; and Fig. 5 is an edge view of the device applied to a curved surface.

It will be understood that the drawings illustrate merely preferred forms of the device, which may be made in various shapes and dimensions appropriate to the purposes for which it is to be used.

The device comprises two composite sheets 1 and 2, each sheet made of a layer of flexible, extensible and compressible material 3, such as rubber or rubber-like material and a flexible layer of substantially non-extensible and non-compressible material 4, such for example as thin sheet metal, plastic or metallic fabric, cemented or otherwise bonded to one surface only of the layer 3. The two composite sheets are assembled and so disposed with relation to each other that their extensible and compressible layers 3 are opposed, and are adapted either to be spaced apart, as illustrated in Fig. 2, or to be brought into contact with each other, as illustrated in Fig. 3.

A flexible and impervious seal 5, which may be made of thin sheet rubber or other suitable material, connects the edges of the two composite sheets and extends completely around the periphery of the device, thus forming in effect an air-tight space between the opposed surfaces. Preferably the edge seal 5 consists of parts of a continuous envelope wholly enclosing the assembled composite sheets, the parts 5a of the envelope overlying the outer surfaces of the composite sheets being cemented or otherwise bonded thereto. A nipple 6 of any usual or desired construction extends through and is sealed to the edge seal 5 and communicates with the interior space between the two composite layers and constitutes a passage for the introduction and evacuation of air or other fluid to and from said space.

The opposed surfaces of the layers 3, 3, as shown in Figs. 2 and 3, are provided with non-slipping characteristics so that one will not slide upon the other when the surfaces are pressed into contact. This may be accomplished by merely providing the surfaces with a sufficiently high coefficient of friction to cause them to grip or cling to each other, when under pressure, firmly enough to prevent slipping under the conditions of use. Preferably, however, these opposed surfaces will be pebbled, as indicated at 7, or knurled, serrated or otherwise roughened so that when pressed together they will virtually interlock.

Instead of applying non-slipping characteristics directly to the opposed surfaces themselves, an equivalent interlocking relation between the surfaces may be obtained in the manner illustrated in Fig. 4. The assembled structure including the two composite sheets 1 and 2, the seal 5 and the nipple 6, may be essentially the same as before, except that the opposed surfaces of the composite sheets need not be roughened or otherwise provided with a sufficiently high coefficient of friction to grip or interlock with each by direct engagement and pressure, but a separate and independent, flexible, gripping sheet or layer 8, having serrated, corrugated or otherwise roughened surfaces on both sides, may be inserted in the space between the two composite sheets. Such gripping or locking layer may be made, for example, of a sheet or strip of wire screening or corrugated sheet metal. When the two composite sheets are pressed together the two opposed surfaces will be locked against relative movement in a planewise direction by the intervening gripping or locking layer 8 and render the structure rigid in whatever position of curvature it may have assumed.

In Fig. 5 the device constructed as above described, and formed in an elongate, narrow, strip-like shape, is shown in profile or edge view, applied to a curved surface 9 of an object 10. The device may be manually flexed and fitted to conform to the curve of surface 9 while the opposed surfaces of the two composite sheets 1 and 2 are in non-locking or non-gripping relation, thus permitting the two composite sheets to shift relatively to each other in a planewise direction and so to bend as a unit. When the device has been properly fitted to the curve 9 the interior space between the opposed surfaces is evacuated or exhausted by means of an ordinary suction pump applied to the nipple 6, causing atmospheric pressure to force the two composite sheets into locking, gripping or non-slipping relation and rendering the device as a whole substantially rigid in its curved shape. The nipple 6 may be provided with a valve or cock 12 to be closed when the interior space has been evacuated or filled, or opened to permit the passage of fluid.

To disengage or release the gripping surfaces and render the device again freely flexible, air or other suitable fluid may be forced into the interior space between the composite strips by means of an ordinary pressure pump applied to the nipple 6. Obviously the same pump, which may be any common form of pressure-vacuum pump P (Fig. 1), may be used both for introducing and exhausting fluid to and from said space.

In order to limit the expansion of said space when pressure is applied thereto, and prevent the composite sheets from unduly bulging, the two sheets may be connected at intervals by flexible threads or cords 11, or other suitable ties. These ties will hold the sheets in substantial parallelism at the desired spacing to facilitate bending and fitting the device to the desired curve, and will fold up or collapse in the space and allow the opposed surfaces to come together when fluid is exhausted from the internal space.

The device is applicable to numerous useful purposes. For example, after fitting it to a curved surface or curved line and rendering it rigid to preserve the curvature, the curve may be transferred to drawings—a process which often requires painstaking plotting by mathematical methods. Or, the curve may be reproduced from the device by molding with a plastic. Or the device may be conformed to a shape or outline of an assemblage, structure or article having movable parts or a changeable form, and then made rigid and used either to hold the assemblage, structure or article in its original configuration, or to aid in restoring it to its original configuration if it becomes disarranged or changed. Other applications of the device will occur to one desiring to duplicate the curvature of a curved surface or line.

The dimensions of the device and its shape in plan may be widely varied, and although I have herein illustrated it in the form of a relatively long and narrow strip-like sheet, its form may be adapted to the work in hand, and it is to be understood that the invention is limited only as defined in the following claims.

I claim:

1. A device of the character described comprising two composite sheets, each sheet comprising a layer of flexible, extensible and compressible material and a layer of flexible but substantially non-extensible and non-compressible material bonded to one surface only of the first layer, said composite sheets being so disposed with relation to each other that the extensible and compressible surfaces are opposed and are adapted either to be locked together by movement toward each other or to be released by movement away from each other to permit relative shifting in a planewise direction, and means for effecting such movement of said surfaces to and from each other.

2. A device of the character described comprising two composite sheets, each sheet comprising a layer of flexible, extensible and compressible material and a layer of flexible but substantially non-extensible and non-compressible material bonded to one surface only of the first layer, the composite sheets being so disposed with relation to each other that the extensible and compressible surfaces are opposed, means for pressing said sheets together and locking means associated with said surfaces to lock them against shifting relatively in a planewise direction when the sheets are pressed together, and said sheets being separable to disengage said locking means thereby to release said sheets from locking position.

3. A device of the character described comprising two composite sheets, each sheet comprising a layer of flexible, extensible and compressible material and a layer of flexible but substantially non-extensible and non-compressible material bonded to one surface only of the first layer, the composite sheets being so disposed with relation to each other that the extensible and compressible surfaces are opposed, means to cause said surfaces to be locked against shifting relatively in a planewise direction when the sheets are pressed together, and said sheets being separable to release them from locking position, a flexible seal connecting the edges of the two composite sheets to form an envelope of which the opposed sheets form the opposite walls and a passage through the seal for introducing and evacuating fluid to and from said envelope.

4. A device of the character described comprising two composite sheets, each sheet comprising a layer of flexible, extensible and compressible material and a layer of flexible but substantially non-extensible and non-compressible material bonded to one surface only of the first layer, said composite sheets being so disposed with relation to each other that the extensible and compressible surfaces are opposed, means for pressing said sheets together and locking means associated with said surfaces to lock them against shifting relatively in a planewise direction when the sheets are pressed together, said sheets being separable to disengage said locking means thereby to release the sheets from locking position, and means connecting the two sheets at intervals to limit the extent of separation of the opposed surfaces.

5. A device of the character described comprising two composite sheets, each sheet comprising a layer of flexible, extensible and compressible material and a layer of flexible but substantially non-extensible and non-compressible material bonded to one surface only of the first layer, the composite sheets being disposed with relation to each other that the extensible and compressible surfaces are opposed and are adapted to be spaced apart or to be brought into contact with each other, the device as a whole being flexible and adapted to assume curved forms when the opposed surfaces are out of contact and said opposed surfaces having non-slipping characteristics to prevent relative movement thereof when in contact, and single means operable to cause the entire areas of the opposed surfaces uniformly to be pressed into non-slipping contact with each other substantially simultaneously to render the device substantially rigid in whatever form of curvature it may have assumed.

6. A device of the character described comprising two composite sheets, each sheet comprising a layer of flexible, extensible and compressible material and a layer of flexible but substantially non-extensible and non-compressible material bonded to one surface only of the first layer, the composite sheets being so disposed with relation to each other that the extensible and compressible surfaces are opposed and are adapted to be spaced apart or to be brought together, a locking layer of flexible material interposed between said opposed surfaces, and single means to cause corresponding areas of the opposed surfaces uniformly to be pressed together and against said locking layer substantially simultaneously to render the device substantially rigid in whatever form of curvature it may have assumed.

WARREN J. MEAD.

REFERENCES CITED

The following references are of record in the file of this patent:

UNITED STATES PATENTS

| Number | Name | Date |
|---|---|---|
| 407,756 | Williams | July 23, 1889 |
| 1,313,482 | Hegardt | Aug. 19, 1919 |
| 2,153,534 | Faught | Apr. 11, 1939 |

FOREIGN PATENTS

| Number | Country | Date |
|---|---|---|
| 125,807 | Great Britain | May 1, 1919 |